United States Patent

Presz, Jr.

[11] 3,837,577
[45] Sept. 24, 1974

[54] MINIMUM DRAG VARIABLE AREA EXHAUST NOZZLE

[75] Inventor: Walter M. Presz, Jr., North Wilbraham, Mass.

[73] Assignee: United Aircraft Corporation, East Hartford, Conn.

[22] Filed: June 29, 1973

[21] Appl. No.: 375,275

[52] U.S. Cl. ............................ 239/265.33, 244/130
[51] Int. Cl. ......................... B64c 23/00, B64c 1/38
[58] Field of Search..... 239/265.11, 265.13, 265.19, 239/265.33, 265.37, 265.39, 265.41; 181/33 HD; 244/130

[56] References Cited
UNITED STATES PATENTS

| 2,596,139 | 5/1952 | Fletcher | 244/130 |
|---|---|---|---|
| 2,870,602 | 1/1959 | Glenn | 239/265.39 |
| 3,262,268 | 7/1966 | Beavers | 239/265.19 X |
| 3,519,207 | 7/1970 | Clough | 239/265.19 X |
| 3,638,862 | 2/1972 | Wildner | 239/265.39 |
| 3,685,738 | 8/1972 | Leibach et al. | 239/265.19 X |
| 3,721,314 | 3/1973 | Hoch et al. | 239/265.13 X |

Primary Examiner—Robert S. Ward, Jr.
Attorney, Agent, or Firm—Stephen E. Revis

[57] ABSTRACT

A variable area exhaust nozzle has the external contour of its flaps forming a substantially continuous afterbody surface with the downstream portion of the engine nacelle when the flaps are extended wherein the afterbody surface so formed has a maximum cross sectional area at its forward end which decreases linearly with respect to its axial length to a minimum cross sectional area at its rearward end. This results in an exhaust nozzle having the lowest possible external drag.

7 Claims, 6 Drawing Figures

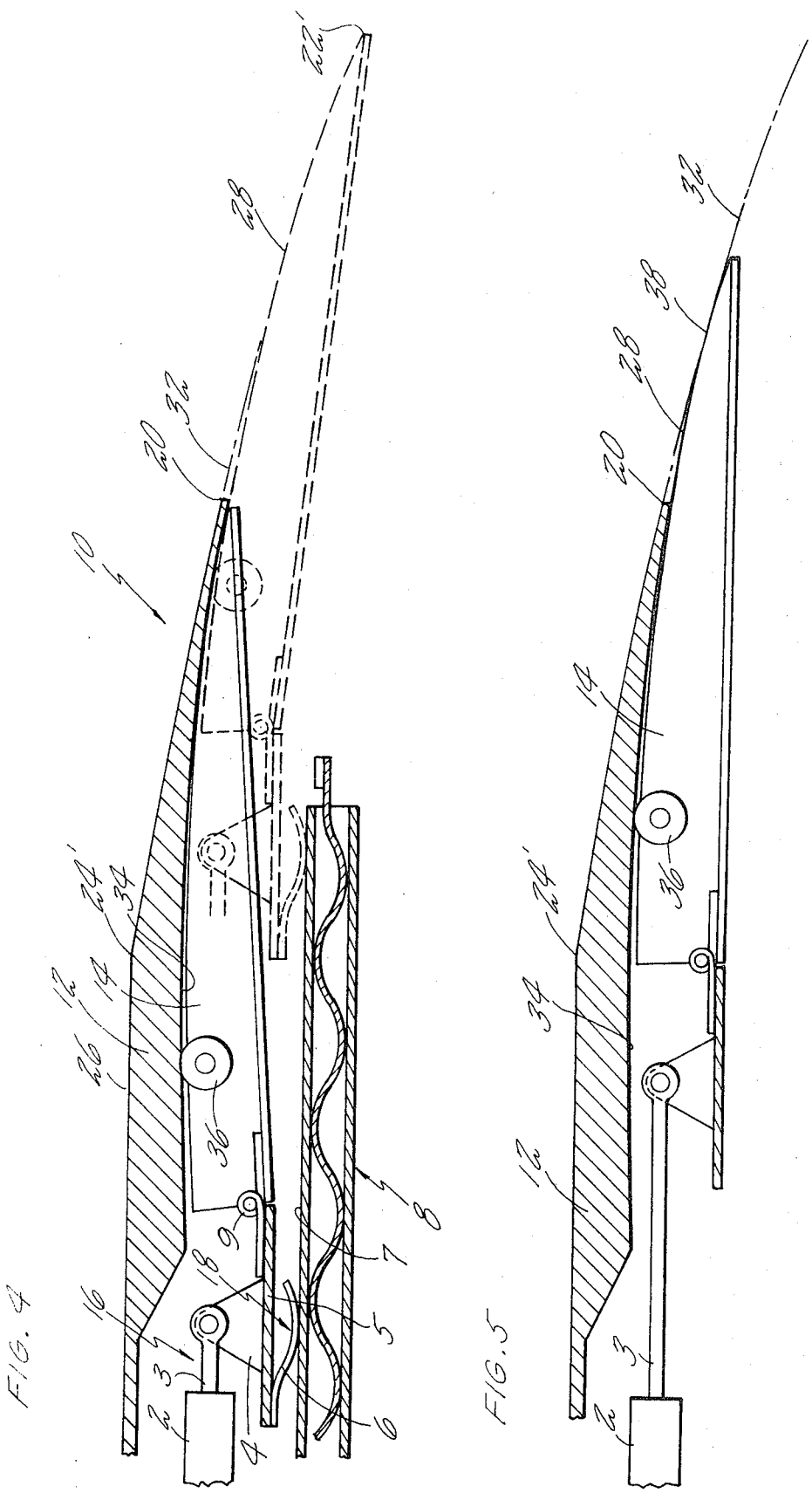

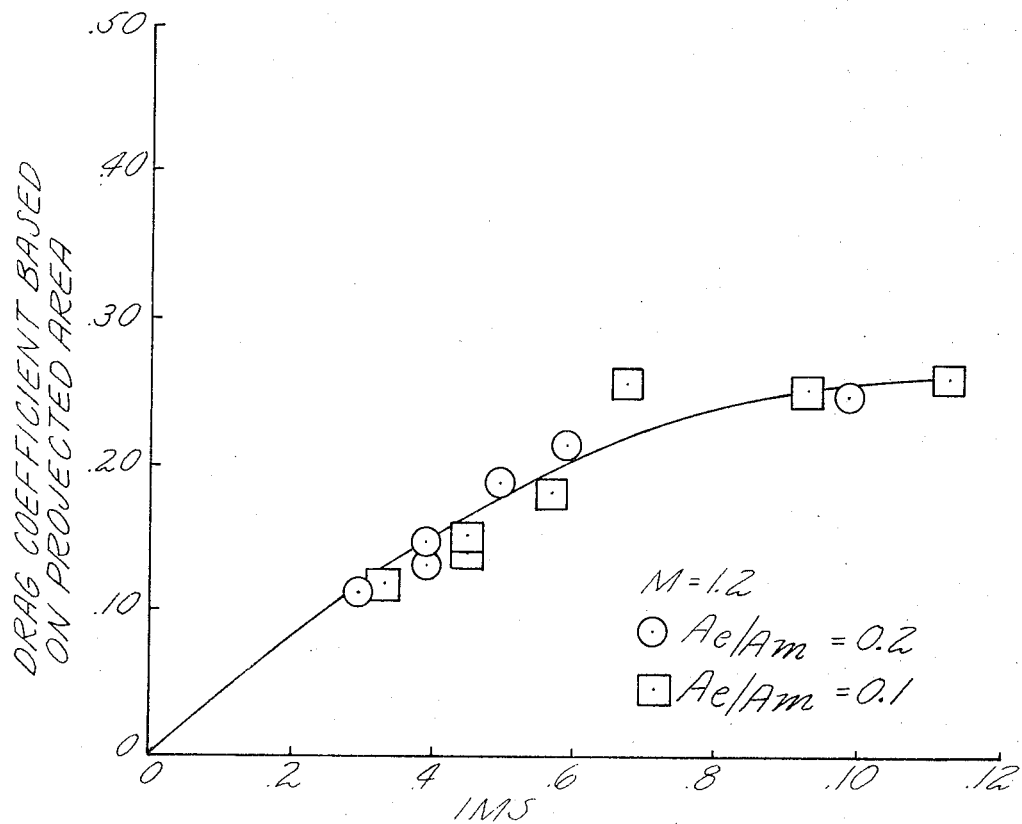

MINIMUM DRAG VARIABLE AREA EXHAUST NOZZLE

This application is related to the subject matter of an application Ser. No. 375,231 by the same inventor entitled MINIMUM DRAG AFTERBODIES filed on even date herewith and of common assignee with this application.

The invention herein described was made in the course of or under a contract or subcontract thereunder, with the Department of the Air Force.

BACKGROUND OF THE INVENTION

1. Field of the Invention

This invention relates to variable area exhaust nozzles for gas turbine engines and more particularly to variable area exhaust nozzles in combination with nacelles for housing gas turbine engines.

2. Description of the Prior Art

Considerable analytical and experimental work has been done over the years to design bodies having streamlined shapes which result in low drag in a flow field. Bodies with long drag are particularly suitable for use with aircraft and other high speed vehicles. For example, Fletcher U.S. Pat. No. 2,596,139 describes a streamlined auxiliary fuel tank for attachment to the wing tip of an airplane designed so that it offers minimum resistance to the speed of the airplane and does not impair airplane maneuverability. Innumerable textbooks have been written which derive and set forth formulae for determining minimum drag contours for bodies of revolution in subsonic, supersonic and hypersonic flow fields. Often their analyses break down at flow stream velocities in the vicinity of Mach 1. Furthermore, it has been found that these analyses are generally concerned with the total drag of a body, which includes, among other things, the drag on the forebody portion, the drag on the afterbody portion, and the base drag. Since the shape of one portion of the body may have an effect on the drag of another portion of the body, the contours of the various portions of the body are juggled to reduce the total drag to a minimum. The result is that the drag is not necessarily a minimum over any one particular portion of the body. As a matter of fact, the contour of an afterbody position which results in minimum drag on that afterbody portion is not described in the prior art.

Nacelles for jet engines hung from the wings of jet aircraft results in some unavoidable drag penalties. Basically, these nacelles include large afterbody portions. Until now the external contour of the afterbody portion of the nacelle has been designed for low drag primarily by trial and error techniques and prior experience since there is no textbook method for determining the afterbody contour which will produce the minimum drag.

Many gas turbine engines have variable area exhaust nozzles which are closely surrounded by the downstream portion of the engine nacelle. Typically, a plurality of circumferentially spaced flaps form the exhaust nozzle for the gas turbine engine and are moved axially and radially to vary the exhaust nozzle area. In some positions the flaps extend rearwardly past the downstream end of the nacelle projecting outwardly therefrom. To reduce drag the flaps may be provided with external contours which form, when extended, extentions of the nacelle external surface so that the air flowing over the external surface of the nacelle sees a continuous surface with a minimum number of discontinuities. Glenn U.S. Pat. No. 2,870,602 is an example of such a variable area exhaust nozzle. In Glenn the structure designated fairing 1 is the nacelle for the downstream or exhaust nozzle portion of a gas turbine engine. It is desirable, of course, that the external surface of the nacelle or fairing and the external surfaces of the flaps create a low drag force for each flap operating position.

SUMMARY OF THE INVENTION

An object of the present invention is a variable area gas turbine engine exhaust nozzle having minimum drag in a plurality of positions.

According to the present invention an exhaust nozzle for a gas turbine engine includes a plurality of circumferentially spaced flaps movable between a plurality of positions wherein in one position the external surface of the nacelle surrounding the engine forms a substantially continuous surface with the external surface of the flaps, the external surfaces having a maximum cross sectional area upstream of the flaps, the cross sectional area decreasing linearly with respect to the axial length of the nozzle to a minimum cross sectional area at the nozzle exit plane. A nacelle and exhaust nozzle combination designed according to the present invention will have the lowest possible drag over a wide range of flow velocities including flow velocities near and including Mach 1.

In one embodiment of the present invention the exhaust nozzle is a two position exhaust nozzle. When the exhaust nozzle is in its fully retracted position, the flaps do not extend downstream of the nacelle, and therefore the nacelle forms the exit plane for the nozzle. When the nozzle is fully extended the flaps extend downstream of the nacelle and their external surfaces form a substantially continuous surface with the external surface of the nacelle. In both positions the external cross sectional area decreases linearly with respect to the axial length of the nozzle from a point upstream of the downstream end of the nacelle to a minimum cross sectional area at the exit plane. Thus, in either flap position the external surface contour results in minimum drag.

As a further modification of the present invention means are provided to position the flap external surface so as to approximate the minimum drag contour at at least one intermediate flap position so that during translation the external contour of the flaps approximates the contour needed for minimum drag.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 4 is a cross sectional side elevation view of a variable area exhaust nozzle assembly incorporating the features of the present invention.

FIG. 5 is a cross sectional side elevation view of the nozzle assembly of FIG. 4 showing the nozzle flaps in an intermediate position.

FIG. 6 is a graph based on experimental test results showing that IMS correlates directly with the drag on an afterbody.

DESCRIPTION OF PREFERRED EMBODIMENTS

Figure 1:
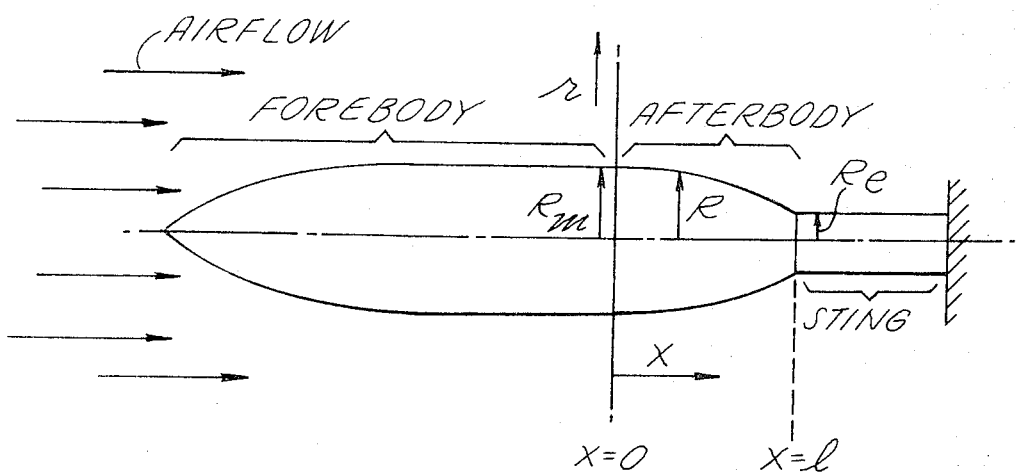
FIG. 1 is a side elevation view of a slender body of revolution mounted on a sting as for use in a wind tunnel.

FIG. 1 represents a body of revolution mounted in a flow field by means of a sting as is commonly done in windtunnels. As shown, the body includes a forebody portion and an afterbody portion. The air is flowing from left to right in the direction of the axis of the body which is herein referred to as the $x$ direction. For the purposes of the following derivation $x$ direction. For the purposes of the afterbody portion where the afterbody has a maximum radius $R_m$. The minimum radius of the afterbody is designated $R_e$ and occurs at $x = l$. The radial direction is herein referred to as the r direction. In order to determine the afterbody contour which results in a minimum drag on that afterbody portion over the range of flow velocities of interest, which in this instance are transonic flow velocities, a parameter is needed which correlates directly with the drag on the afterbody portion.

For an axisymmetric slender body the linearized inviscid flow equation for high subsonic Mach numbers is:

$$(1 - M_\infty^2)Q_{xx} + (1/r)Q_r + Q_{rr} = 0 \quad (1)$$

where $M_\infty$ is the free stream Mach number, $Q$ is the velocity potential, single subscripts on the $Q$'s indicate a first partial derivative of $Q$ with respect to that subscript, and double subscript on the $Q$ indicate second partial derivatives of $Q$ with respect to the particular subscripts.

A standard solution to this equation (from slender body theory) is:

$$Q = -\frac{U_\infty}{4\pi} \int_0^1 \frac{A'(\gamma)d\gamma}{\sqrt{(x-\gamma)^2 + \lambda r^2}} \quad (2)$$

where $U_\infty$ is free stream velocity, $A$ is the cross sectional area of the body perpendicular to its axis and is a function of $x$, $A'$ equals $\delta A/\delta X$, $\gamma$ is a dummy integration variable, $\lambda$ equals $(1=M_\infty^2)$, and $l$ is the length of the body. Equation (2) can be differentiated to give the following body surface velocities:

$$Q_x = \frac{u}{U_\infty} = \frac{1}{4\pi} \int_0^1 \frac{A'(\gamma)(x-\gamma)d\gamma}{\left[(x-\gamma)^2 + \frac{\lambda A}{\pi}\right]^{3/2}} \quad (3)$$

where $\mu/U_\infty$ is a nondimensional velocity. At high subsonic Mach numbers (i.e., $M$ is close to 1.0) and where the length of the body is at least equal to the maximum radius of the body (i.e., slender body) it follows that $(x-\gamma)$ is greater than $\lambda A/\pi$ since $\lambda << 1.0$. Thus, we can expand the denominator of the integrand in equation (3) to give:

$$[(X-\gamma)^2 + (\lambda A/\pi)]^{3/2} \approx (X-\gamma)[(X-\gamma)^2 + (3\lambda A/2\pi)] \quad (4)$$

Equation (3) now takes on the following form $$\frac{u}{U_\infty} = \frac{1}{4\pi} \int_0^1 \frac{A'(\gamma)d\gamma}{(x-\gamma)^2 + \frac{3\lambda A}{\pi}} \quad (5)$$

since $(x-\gamma)$ is greater than $\lambda A/\pi$, the largest contribution to the integral is in the region near $\gamma$ equals $x$. We therefore expand $A(\gamma)$ about this point in a Taylor series expansion and approximate the integral to a high degree of accuracy. Retaining only first order terms in this expansion gives the following approximation for equation (5):

$$\frac{u}{U_\infty} = \frac{A'}{4\pi} \int_0^1 \frac{d\gamma}{\left[(x-\gamma)^2 + \frac{3\lambda A}{2\pi}\right]} \quad (6)$$

or $$\frac{u}{U_\infty} = \frac{A'}{4\pi} \sqrt{\frac{2\pi}{3\lambda A}} \int_0^1 \frac{\sqrt{\frac{3\lambda A}{2\pi}}d\gamma}{\left[(x-\gamma)^2 + \frac{3\lambda A}{2\pi}\right]} \quad (7)$$

For values of $l$ much greater than $3\lambda A/2\pi$ the value of the integral in equation (7) is directly available and is $\pi/2$. Thus equation (7) reduces to:

$$\mu/U_\infty = C_1/\sqrt{1-M_\infty} \cdot A'/R \quad (8)$$

where $C_1$ is a constant and since $A = \pi R^2$, $A$ can be expressed as $R$ where $R$ is the radius of the afterbody portion and is a function of $x$. For slender bodies, the following expression can be derived for the pressure coefficient over a body:

$$C_p = -2(\mu/U_\infty) - (\delta R/\delta x)^2 \quad (9)$$

where $C_p$ is the pressure coefficient. Combining equation (8) and (9) gives:

$$C_p = C_1/\sqrt{1-M_\infty^2} \cdot A'/R - (R')^2 \quad (10)$$

where $R'$ equals $dR/dx$. The drag over a body can be obtained from the following expression which is simply an integration of the pressure force over the afterbody:

$$\frac{D}{\theta} = \int_{A_e}^{A_m} C_p dA \quad (11)$$

where $D$ is drag force, $\theta$ is dynamic head, $A_e$ is the minimum cross sectional area of the body and $A_m$ is the maximum cross sectional area of the body. Combining equation (10) and (11) gives:

$$\frac{D}{\theta} = \int_{A_e}^{A_m} \left[\frac{C_1}{\sqrt{1-M_\infty^2}} \cdot \frac{A'}{R} - (R^1)^2\right] dA \quad (12)$$

For slender afterbodies where the difference between the minimum and maximum cross sectional areas are not great, such as is depicted for the afterbody portion shown in FIG. 1, the assumptions used in this derivation are appropriate at high subsonic Mach numbers. Furthermore, the following expressions are valid:

$$R \approx R_m \quad (13)$$

$$A' \approx -2\pi R_m y' \quad (14)$$

$$(R_m - R_e/l)^2 << R_m - R_e/l \quad (15)$$

where $y$ is a variable and equals $(R_m - R)$ and $y'$ is the first derivative of $y$ with respect to $x$. Using these approximations in equation (12) gives:

$$\frac{D}{\theta} = \frac{C_2}{\sqrt{1-M_\infty^2}} \int_{A_e}^{A_m} A' dA \qquad (16)$$

or equivalently:

$$C_D(\sqrt{1-M_\infty^2}) \propto \int_{A_e}^{A_m} A' dA \qquad (17)$$

where $C_D$ is the drag coefficient and where the right-hand side of the expression is simply the integration of the mean slope of area over the area distribution. By non-dimensionalizing appropriate terms, equation (17) becomes:

$$C_D(\sqrt{1-M_\infty^2}) \propto \frac{\int_{A_e/A_m}^{1.0} \frac{d(A/A_m)}{d(x/D_{eq})} d(A/A_m)}{1-\frac{A_e}{A_m}} \qquad (18)$$

where $D_{eq}$ equals equivalent diameter or $\sqrt{4A_m/\pi}$. The above expression is approximate in nature and is a correlating parameter applicable at transonic Mach numbers and justifiable from the governing flow equations. A similar expression can be obtained quite readily using a parallel approach for low supersonic Mach numbers. In that case the governing inviscid flow equation becomes:

$$(M_\infty^2 - 1)Q_{xx} + (1/r) Q_r + Q_{rr} = 0 \qquad (19)$$

and the resulting drag correlating parameter is:

$$\text{IMS} = C_D(\sqrt{M_\infty^2 - 1}) \propto \frac{\int_{A_e/A_m}^{1.0} \frac{d(A/A_m)}{d(x/D_{eq})} d(A/A_m)}{1-\frac{A_e}{A_m}} \qquad (20)$$

where IMS is a shorthand expression for the correlating parameter and strands for "Integral Mean Slope."

IMS has been found, by experimental tests, to correlate directly with drag on an afterbody in a flow field having a Mach number within the range of 0.5–2.0. FIG. 6 is a graph developed from experimental tests at Mach 1.2 and plots IMS on the horizontal axis against drag coefficient ($C_D$) on the vertical axis. These tests were conducted on afterbodies having area ratios $A_e/A_m$ of 0.1 and 0.2. It may readily be seen that the IMS is essentially in one to one correspondence with the drag force. IMS may thus be used to predict pressure and friction drag for afterbodies at transonic Mach numbers. It is expected that correlation exists even at Mach numbers greater than 2.0.

Now that an expression has been derived which both analytically and experimentally correlates directly with drag, it is a relatively simple matter to minimize that expression so as to arrive at a formula which will express a minimum drag contour for an afterbody. Equation (18) or (20) can be put into much more manageable form as:

$$\text{IMS} = \frac{2R_m}{A_m(A_m - A_e)} \int_0^1 \left(\frac{dA}{dx}\right)^2 dx \qquad (21)$$

since $A$ equals $\pi R^2$ we can write equation (21) as follows:

$$\text{IMS} = \frac{8\pi^2 R_m}{A_m(A_m - A_e)} \int_0^1 (RR')^2 dx \qquad (22)$$

It should be apparent at this point that if the expression for IMS in equation (22) is minimized, an expression will be obtained which represents the minimum drag contour for an afterbody. The problem of minimizing the IMS integral expression thus results in minimizing the simplified integral expression:

$$I = \int_0^1 (RR')^2 dx \qquad (23)$$

from calculus of variations a necessary, and in this case a sufficient requirement for $I$ to be minimum is that:

$$\delta/\delta x (\delta F/\delta R') - \delta F/\delta R = 0 \qquad (24)$$

where $$F = (RR')^2 \qquad (25)$$

by combining equations (24) and (25) we have the following governing differential equation defining the optimum contour for minimum drag:

$$R^2 R'' + R(R')^2 = 0 \qquad (26)$$

By rearranging, equation (26) becomes:

$$RR'' + (R')^2 = \delta/\delta x (RR') = 0 \qquad (27)$$

The solution of equation (27) is:

$$R = \sqrt{C_3 X + C_4} \qquad (28)$$

Referring to FIG. 1, the appropriate boundary conditions are:

$$\left. \begin{array}{l} X = 0 \text{ at } R = R_m \\ X = l \text{ at } R = R_e \end{array} \right\} \qquad (29)$$

Substituting these boundary conditions into equation (28), solving for $C_3$ and $C_4$ and then plugging those numbers back into equation (28) gives:

$$R/R_m = \sqrt{1-(x/l)[1-(R_e/R_m)^2]} \qquad (30)$$

This may be expressed in terms of cross sectional area as follows:

$$A/A_m = 1 - (x/l)(1 - A_e/A_m) \qquad (31)$$

or $$A = C_5 X + C_6 \qquad (31a)$$

where $C_5 = A_e - A_m$ and $C_6 = A_m$.

By substituting equation (31) into equation (21) and integrating, the following expression for minimum IMS is obtained:

$$(IMS)_{min} = 2R_m l [1 - (R_e/R_m)^2] \qquad (32)$$

Figure 2:
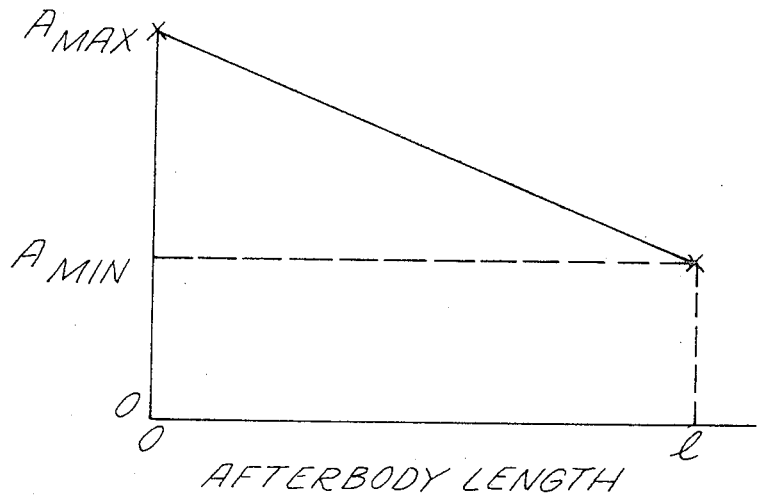
FIG. 2 is a graph representing the minimum drag area distribution of an afterbody.
Figure 3:
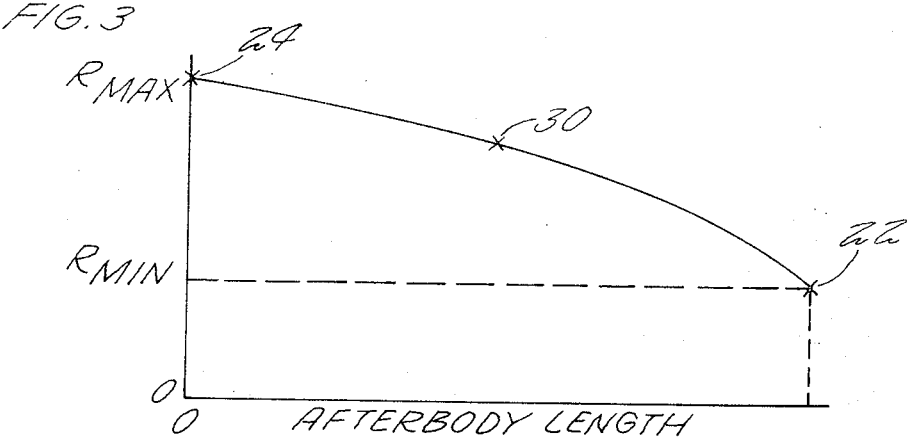
FIG. 3 is a graph representing the minimum drag radius distribution for an afterbody.

Since afterbody drag does correlate with IMS in a one-to-one correspondence, equations (31) and (31a) define minimum drag afterbodies. In words, equation (31a) simply says that given an afterbody whose external surface is a surface of revolution varying from a maximum cross sectional area perpendicular to its axis at its upstream end to a minimum cross sectional area perpendicular to its axis at its downstream end, then, for the afterbody to have minimum drag, the cross sectional area of the afterbody should decrease linearly with respect to the axial length of the afterbody from the maximum cross sectional area to the minimum cross sectional area. Equation (31a) is represented by the straight line on the graph of FIG. 2 where axial length ($x$) of the afterbody is measured along the horizontal axis and the vertical axis represents the cross sectional area ($A$) of the afterbody. The maximum cross sectional area of the afterbody is at zero along the horizontal axis and is so designated in FIG. 2. The minimum cross sectional area is at the rearward end of the afterbody at an axial distance $l$. The area variation along the axial length which produces minimum drag on the afterbody is represented by the straight line connecting these two points. The graph of FIG. 2 can be converted to radii as shown in FIG. 3. The graph of FIG. 3 thus shows the actual external contour of an afterbody having minimum drag. Throughout the length of the afterbody the slope times the radius of the afterbody is equal to a constant. This can be represented by the following formula:

$$RR' = C \qquad (33)$$

where $R$ is the radius, which is a variable, $R'$ is the first derivative of the radius with respect to axial length (i.e., the slope) and $C$ is a constant.

As can be seen from FIG. 3 the curvature of minimum drag afterbodies increases along its axial length as the diameter decreases. This is entirely opposite of how prior art afterbody models are designed. It can be seen from an examination of equation (33) that the slope becomes infinite as the diameter approaches zero. As is well known by those skilled in the art, separation of the airflow from the surface of the afterbody will occur when the curvature becomes too great in relation to the velocity of the flow field. The expressions hereinbefore derived assume that separation does not occur. At the point along the axial length of the afterbody where separation does occur the equations do not apply and are not intended to generate minimum drag contours downstream of the point of separation. Thus, downstream of the point of separation it may be desirable to alter the contour of the afterbody such that separation does not occur. The formulas hereinabove derived are not helpful in determining such downstream contours.

Consider, as an application for the hereinabove derived minimum drag afterbody contour, the variable area exhaust nozzle shown in FIG. 4. The basic mechanism and construction of this exhaust nozzle is in most respects identical to the construction and operation of the exhaust nozzle shown in U.S. Pat. No. 2,870,602 to Glenn. For this reason only this single view of the exhaust nozzle is shown. For other details of the construction and operation of the subject nozzle the reader is referred to Glenn which is incorporated herein by reference. Differences between Glenn and the present invention will be pointed out in the following paragraphs.

The exhaust nozzle of FIG. 4 is generally represented by the numeral 10 and comprises an external fairing or nacelle 12, a plurality of circumferentially spaced flaps 14, actuation means generally represented by the numeral 16 including guide means generally represented by the numeral 18. The actuation means 16 includes a plurality of pistons 2 and pushrods 3 connected through links 4 to unison ring 5. The guide means 18 includes springs 6 and guide surface 7 which is the inner wall surface of the engine casing 8. The springs 6 are attached to the unison ring 5 and slide on the guide surface 7 as the flaps 14 are actuated. The flaps 14 are connected to the unison ring 5 by piano type hinges 9 which bias the flaps 14 radially outwardly as does the gas load.

FIG. 4 shows the flaps in two positions. The solid lines represent the flap in its fully retracted position wherein it is completely surrounded by the nacelle 12. The dotted lines represent the flap in its fully extended position wherein a portion extends downstream of the rearward end 20 of the nacelle 12.

As hereinbefore discussed, it is desirable that the external contour of the afterbody portion of a body in a flow stream have a certain shape to result in minimum drag. Such a shape is represented by the curve of FIG. 3. If $R_{min}$ is the minimum radius of the flap external surface when the flaps are fully extended, then the point marked 22 on the graph of FIG. 3 should correspond to the point marked 22' in FIG. 4, which is at the downstream end of the flaps 14. $R_{max}$ in the graph of FIG. 3 is indicated by the numeral 24 on the curve and is the maximum radius of the external contour of the afterbody. This, for example, is the point indicated by the numeral 24' in FIG. 4, which in this embodiment is the maximum radius of the nacelle 12. When the flaps are in their fully extended position, the external contour of the exhaust nozzle 10 is comprised of the external surface 26 of the nacelle 12 and the external surfaces 28 of the extended portions of the flaps 14. It should now be clear that the portions of the surfaces 26, 28 between the points 22' and 24', to produce minimum drag forces, should have the contour represented by the graph of FIG. 3 and equations (31) and (32). It is important to recognize that there will be a slight discontinuity between the surface 26 and the surface 28 at the downstream end 20 of the nacelle 12 due to the fact that the nacelle 12 must have some thickness at its downstream end 20. The dot-dash line 32 represents the theoretically desired contour of the surface 28. In this specification and in the claims appended hereto the contour of the surface 28 is stated as being the theoretical contour represented by the line 32; however, it is merely meant that the external surfaces 28 of the flaps 14 are configured as close as is practically possible to the desired contour. When the flaps 14 are fully retracted, then the downstream end 20 of the fairing 12 defines the minimum radius of the external surface. This point 20 is represented by the point 30 on the curve of FIG. 3. Thus, in the fully retracted position the critieria for minimum drag is retained without difficulty.

As has been stated, the minimum drag contour increases in curvature as the diameter decreases. Thus, as the flaps 14 are retracted the surface 28 does not remain parallel to the portion of the surface 26 between the points 24', 20 as it does in the Glenn patent hereinbefore referred to. Specially contoured surface 34 is provided for the rollers 36 to help guide the flaps 14 while maintaining as small a gap as possible between the surface 28 and the rearward end 20 of the nacelle 12. Rather than the rollers 36, it may be possible to provide a roller which is fixed to the rearward end 20 of the nacelle 26 and to let the flaps contact the rearward end 20 at those rollers as the flaps move.

FIG. 5 shows the nozzle of FIG. 4 with the flaps 14 in an intermediate position. The dimensions of the flaps 14 and the position of the actuation means 16 has been carefully chosen such that at this one intermediate position the portion of the surface 28 extending downstream of the end 20 closely approximates the theorectically desired contour 32. In this instance one point along the surface 28 designated by the numeral 38 is tangent to the curve 32. It should be immediately recognized that it is not possible to get a perfect fit since, as has already been stated, the curvature of the extended portion of the surface 28 in FIG. 5 is greater than the curvature of the portion of the theoretical curve 32 immediately downstream of the end 20 of the nacelle 12.

Thus, in the embodiment shown in FIGS. 4 and 5 the variable area nozzle and nacelle or fairing assembly has been designed for minimum external drag in three positions. It is of course desirable to have the extended portion of the surface 28 move in a manner such that it approximates the theoretical curve 32 at all intermediate positions or at least at a large number of intermediate positions so that minimum drag or a close approximation thereto is achieved throughout translation of the flaps 14. This is easier said than done in view of the constantly changing curvature of the theoretical curve 32. The nozzle assembly shown in FIGS. 4 and 5 is not particularly suited to achieve this result in view of its relative simplicity and the limited number of degrees of freedom of the assembly. It is expected that best results would be achieved with a more complex nozzle having additional degrees of freedom which would permit or cause the nozzle flaps 14 to translate and rotate in a manner which keeps a close fit between the contour of the extended portion of the surface 28 and the theoretical contour 32 throughout flap movement.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of my invention that which I claim as new and desire to secure by Letters Patent of the United States is:

1. A variable area exhaust nozzle for a gas turbine engine comprising:

a nacelle having an axis, a rearward end, and first external surface means spaced from said axis;

nozzle forming means disposed within said nacelle and operable between a plurality of positions, said positions including a first position, said nozzle forming means defining the jet exhaust area of the gas turbine engine, said nozzle forming means including second external surface means spaced from said axis and having a downstream end, wherein when said nozzle forming means is in said first position said second external surface means forms a first downstream extension of said first external surface means, said first external surface means and said downstream extension of said first external surface means defining the external surface of an afterbody, said external surface being a surface of revolution, the cross-sectional area of said afterbody taken perpendicular to the axis thereof decreasing linearly with respect to axial length from a maximum cross sectional area upstream of said rearward end of said nacelle to a minimum cross sectional area at said downstream end of said second external surface means; and actuation means connected to said nozzle forming means for moving said nozzle forming means from one position to another.

2. The variable area exhaust nozzle according to claim 1 wherein said plurality of positions includes a second position in which said second external surface means is completely surrounded by said first external surface means.

3. The variable area exhaust nozzle according to claim 2 wherein said nozzle forming means includes a plurality of flaps circumferentially spaced about said axis.

4. The variable area exhaust nozzle according to claim 3 wherein said plurality of positions includes a third position in which said second external surface means forms a second downstream extension of said first external surface means, said second downstream extension of said first external surface means closely approximating the contour of an imaginary afterbody having a surface of revolution wherein the cross sectional area of said imaginary afterbody, taken perpendicular to the axis thereof, decreases linearly with respect to axial length from a maximum cross sectional area at said rearward end of said nacelle to a minimum cross sectional area at the downstream end of said second external surface means.

5. The variable area exhaust nozzle according to claim 4 wherein said second downstream extension is tangent to said surface of revolution of said imaginary afterbody at one point thereof.

6. The variable area exhaust nozzle according to claim 3 wherein in said first position said flaps are fully extended and in said second position said flaps are fully retracted.

7. The variable area exhaust nozzle according to claim 4 wherein in said first position said flaps are fully extended, in said second position said flaps are fully retracted, and in said third position said flaps are intermediate said first and second positions.

* * * * *

PO-1050
(5/69)

UNITED STATES PATENT OFFICE
CERTIFICATE OF CORRECTION

Patent No. 3,837,577         Dated September 24, 1974

Inventor(s) Walter M. Presz, Jr.

It is certified that error appears in the above-identified patent and that said Letters Patent are hereby corrected as shown below:

Column 1, line 23, change "long" to --low--; line 45, change "position" to --portion--; line 66, change "extentions" to --extensions--.

Column 3, line 15, delete "direction. For" and insert --equals zero at the forward end of--; line 16, delete "the purposes of"; line 46, change "$(1 = M_\infty^2)$" to --$(1 - M_\infty^2)$--.

Column 4, equation (8), change "$\sqrt{1 - M_\infty}$" to --$\sqrt{1 - M_\infty^2}$--; equation (10), change "(R')" to --$(R')^2$--.

Column 6, equation (31), change "$(1 - A_e A_m)$" to --$(1 - A_e/A_m)$--; line 48, change "$A_e - A_m$" to --$\dfrac{A_e - A_m}{\ell}$--.

Signed and sealed this 24th day of December 1974.

(SEAL)
Attest:

McCOY M. GIBSON JR.
Attesting Officer

C. MARSHALL DANN
Commissioner of Patents